May 16, 1967  F. D. KOTTLER  3,319,548
MULTILAMP FLASH PHOTOGRAPHY
Filed Dec. 14, 1964  2 Sheets-Sheet 1

FRANK D. KOTTLER
INVENTOR.

BY
ATTORNEYS

May 16, 1967   F. D. KOTTLER   3,319,548
MULTILAMP FLASH PHOTOGRAPHY
Filed Dec. 14, 1964   2 Sheets-Sheet 2
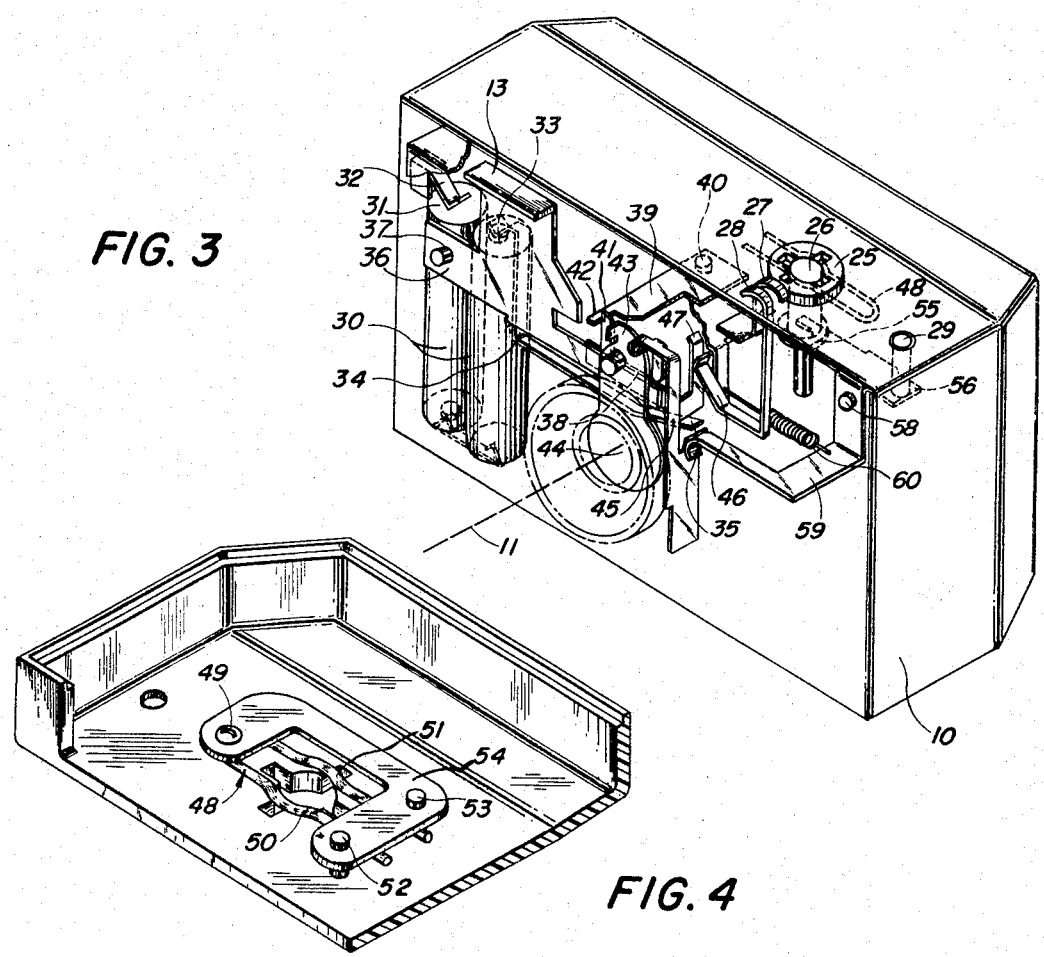
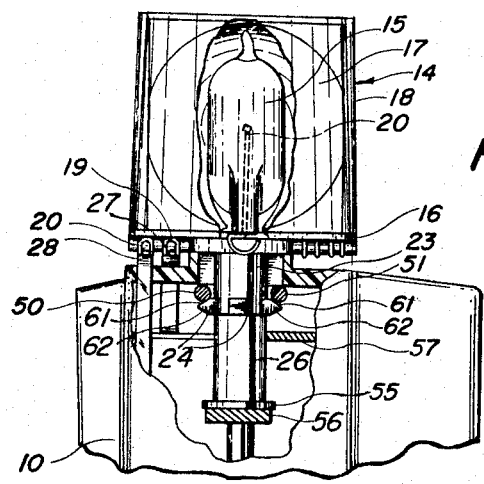
FRANK D. KOTTLER
INVENTOR.
BY R. Frank Smith
Ronald S. Kanlen
ATTORNEYS United States Patent Office 3,319,548
Patented May 16, 1967

3,319,548
MULTILAMP FLASH PHOTOGRAPHY
Franklin D. Kottler, Rochester, N.Y., assignor to Eastman Kodak Company, Rochester, N.Y., a corporation of New Jersey
Filed Dec. 14, 1964, Ser. No. 417,915
12 Claims. (Cl. 95—11)

The present invention relates to flash photography, and more particularly, to disposable multilamp photoflash packages and a camera or other photographic apparatus for receiving such packages.

With the development of miniaturized photoflash lamps such as the all glass (AG) lamps, there is contemplated a disposable package containing a plurality of such lamps and designed for simple handling and more rapid lamp replacement after each flash exposure. In this respect, the present invention provides new and useful connecting means including a connecting base for such disposable multilamp packages and a receiving socket forming a part of the camera, the base being insertable in the socket whenever flash exposures are desired.

An important object of the present invention resides, therefore, in the provision of a means for connecting a disposable multilamp photoflash package or unit with a photographic camera or other apparatus to enable the taking of a series of pictures with supplementing photoflash.

Another object of the present invention is to provide a receiving socket arrangement and retaining means in a photographic flash circuit which will receive a disposable multilamp photoflash unit to insert a selected one of the photoflash lamps into the flash circuit.

Yet another object is to provide a connecting base for such a disposable multilamp photoflash unit which is readily connectable with the receiving socket arrangement of the photographic camera or other flash apparatus.

Still another object is to provide a means for adjusting the camera operating mechanism for flash whenever a multilamp photoflash unit is inserted into the receiving socket.

And another object is to provide a means for ejecting the multilamp photoflash unit and to adjust the camera operating mechanism for daylight operation whenever flash is not desired.

These and other objects and advantages will become more apparent in the course of the following description, in which the accompanying drawing forms a part thereof and wherein:

FIG. 3 is a perspective view of the camera with its front cover removed to show various elements of the camera forming a part of the invention;

FIG. 4 is a bottom view of the top cover of the photographic camera, showing the retaining means for releasably holding a disposable multilamp photoflash unit in the receiving socket; and FIG. 5 is a partial sectional view taken on line 5—5 of FIG. 1.

Figure 1:
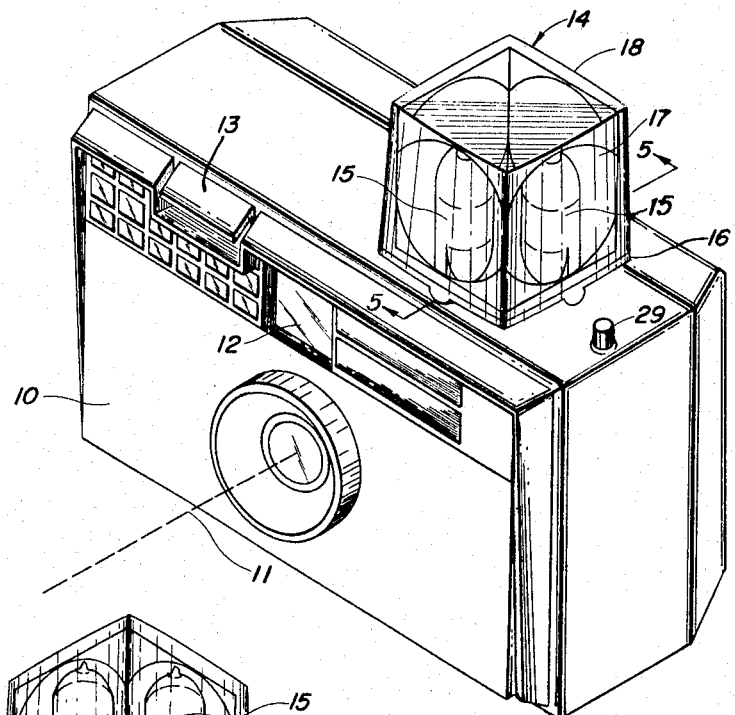
FIG. 1 is a perspective view of a preferred embodiment of a photographic camera according to the present invention and a disposable multilamp photoflash package inserted in the receiving socket thereof.
Figure 2:
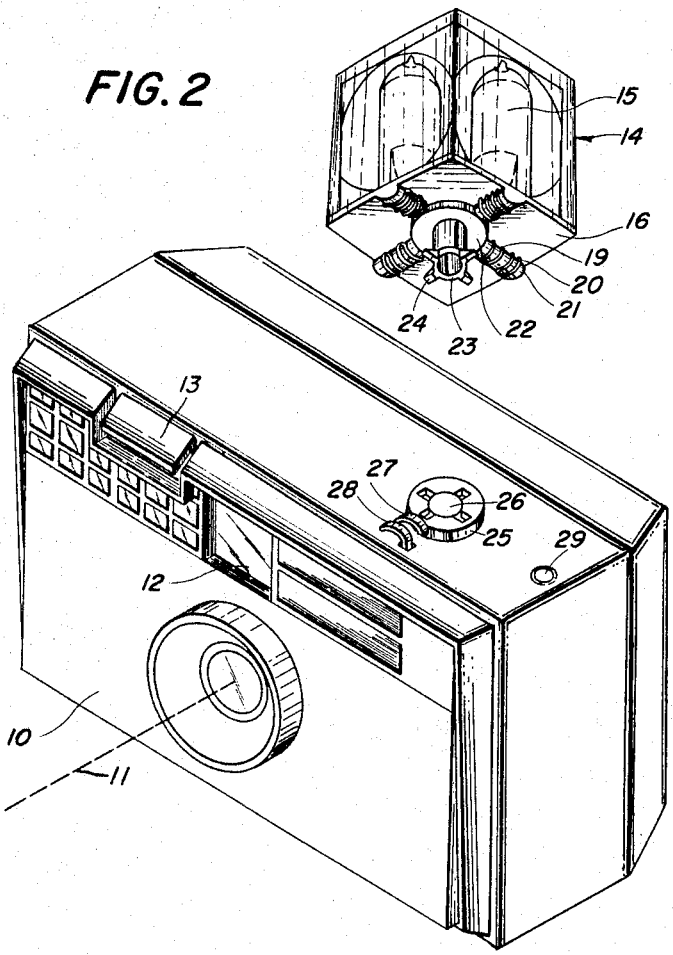
FIG. 2 is a perspective view of the camera and the photoflash package with the package being removed from the receiving socket of the camera.

With reference to FIGS. 1 and 2, the present invention relates to an improved photographic camera and socket arrangement for receiving disposable multilamp packages. Typcially, a photographic camera embodying the present invention includes a housing 10 and an objective or picture-taking axis 11 on which the camera elements such as a lens, diaphragm aperture and a frame of light sensitive photographic film normally are disposed. There may also be a typical viewfinder 12 and a body release member 13 used to initiate the picture-taking operation. However, the present description will be limited to those elements forming a part of or cooperating directly with the present invention, the elements which are not shown here being understood to be selected from those known in the photographic art.

Detachably connectable with the camera is a disposable multilamp photoflash package or unit 14 which comprises a plurality (four) of photoflash lamps 15 of known manufacture such as an AG (all glass) variety orthogonally disposed in a vertical position on respective sides of a substantially square horizontal base 16 about a central vertical axis thereof. Behind each photoflash lamp 15 is an individual dished reflector 17 sufficient to provide the proper light emission pattern without the need for additional reflector surfaces. A transparent or light transmitting protective cover 18 of cubic shape having a top and four side walls is permanently sealed to the upper surface of the base 16. The cover 18 functions as a flash guard and it permits easy handling of the multilamp unit by eliminating the need for handling miniature or hot lamps, etc.

Each photoflash lamp 15 includes a pair of lead-in wires 19, 20 extending to the interior of the hermetically sealed glass envelope of the respective lamp in a known manner in order to ignite a charge of combustible material therein whenever an electrical potential is applied to the lead-in wires. The ends of the lead-in wires 19, 20 pass downwardly through suitable openings in the base 16 and are bent at their respective ends to form stirrups in a manner like that of existing AG photoflash lamps, the U-ends of the stirrups all facing in a clockwise direction when looking at the base 16 from below.

Underlying the stirrup ends of the lead-in wires 19, 20 of each of the photoflash lamps 15 is a curved wire support 21 extending radially outwardly to the center of the respective side of the multilamp unit 14 from a central boss 22.

The base 16 further includes a depending center post 23 of cylindrical shape and four equally spaced retaining lugs 24 extending radially outwardly from the post 23 at its lower end.

To provide for flash operation, the multilamp unit 14 is inserted into a receiving socket 25 having an opening with a central bore and extended slots designed to receive the center post 23 and lugs 24. A movable socket cover 26 fits within the central bore of the socket and is abuttable with the bottom edge of post 23 to be thereby moved downwardly when the multilamp unit 14 is inserted into the receiving socket.

Because each of the lugs 24 extend radially outward in a direction corresponding to the axis of light emission of one of the lamps 15, the socket 25 is similarly positioned so that, upon insertion of the multilamp unit 14 into the socket 25 in any one of four positions as determined by the position of extended slots, one of the photoflash lamps 15 will be facing forward, i.e. in the direction of the objective axis 11. Correspondingly, exposed contact terminals 27, 28 of a photoflash circuit in the housing 10 are positioned in front of the receiving socket 25 such that electrical contact is made between the terminals 27, 28 and the respective lead-in wires 19, 20 of the forward facing photoflash lamp 15.

A multilamp unit ejector button 29, which pops out of the camera housing 10 when a multilamp unit 14 is inserted (FIG. 1) is also provided to permit ready ejection of the multilamp unit 14 by pushing when flash operation of the camera is not desired.

Referring now to FIG. 3, the camera includes a flash circuit which is comprised of a source of electric potential such as a pair of batteries 30 connected in series at their lower terminals by a shorting bar. The negative terminal 31 of the battery series 30 is electrically connected to the camera ground by way of a fixed contact plate 32, and positive terminal 33 of the batteries 30 is electrically connected to a spring contact element 34 which is suitably anchored at its left end, the right end 35 of contact element 34 being biased in an upward direction against a stop (not shown) in the position shown in FIG. 3.

The accessible body release 13 forms a part of a shutter release trigger lever 36 which is pivotably mounted on pin 37 and biased upwardly (in a counterclockwise direction) by a spring against a suitable stop (not shown).

A latching bar 38 of electrically conductive material is attached to the inside of shutter trigger lever 36 by means of adjustable screws or the like and is separated therefrom by insulation. In its up position as shown in FIG. 3, the camera shutter mechanism is cocked and ready to respond to depression of body release 13. In this position, latching bar 38 is spaced from end 35 of contact element 34, and a shutter striking plate 39, which is rotatably mounted about pivot 40, is strongly biased for movement to the right. A detent 41 forming a part of latching bar 38 holds the striking plate 39 against movement until the body release 13 is depressed to move detent 41 out of the path of movement of striking plate 39. This permits striking plate 39 to be moved rapidly to the right such that finger 42 on the end of the striking plate 39 strikes ear 43 of the pivoted impact shutter blade 44, thereby causing blade 44 to be moved to the left out of alignment with axis 11, and momentarily opening or uncapping the film exposure aperture. The shutter blade 44 is then returned automatically to its capping position after a predetermined period of time by a spring (not shown) which is known in the art.

The predetermined shutter operating time, for example 1/40 sec., is made use of during camera operation with photoflash, whereas a resilient stop plate 45 is placed in the path of movement of ear 43 by overcoming the resilience to arrest the motion of the shutter blade 44, thereby returning the blade to its capping position in a shorter period of time, say 1/80 sec., for daylight operation. The operation of the stop 45 is controlled by insertion of a multilamp unit as described later.

To complete the flash circuit of the camera 10, one terminal 27 is electrically connected to the camera ground. The striking plate 39 is also electrically connected to ground to provide a direct connection to the terminal 27. The other terminal 28 is electrically connected to a fixed brush contact 46 (shown as being formed integrally therewith) which is designed to make electrical contact at all times with a switch arm 47. The switch arm 47 is made of electrically conductive material and is electrically connected to latching bar 38, this being accomplished by forming switch arm 47 integrally with latching bar 38. Switch arm 47 is designed to make electric contact with the right end 35 of spring contact element 34 whenever lever 36 is depressed by operation of body release 13.

The operation of the flash circuit is more fully described in U.S. Patent No. 3,139,805, but it will be stated here that a shunt is provided by electrical contact of arm 47 with contact element 34 immediately upon initial depression of lever 36 but prior to movement of detent 41 fully out of the path of movement of striking plate 39. Upon full depression of lever 26, detent 41 breaks electrical contact with plate 39 by movement out of its path, thereby breaking the short circuit by passing the photoflash lamp 15 in engagement with terminals 27, 28 and igniting the photoflash lamp.

Referring to FIG. 4, the multilamp unit retaining means according to the present invention comprises a hairpin spring 48 bent around a pin 49 and having a pair of legs 50, 51 extending longitudinally on either of two sides of the central bore opening of socket 25 with the portions thereof adjacent the socket opening overlying the front and back extended slots and each being curved on an arc of at least 90° with a radius equivalent to the radius of the spindle 26 and the central bore. The free ends of spring legs 50, 51 bias away from each other and are held by limiting stop pins 52, 53 and an overlying U-shaped yoke 54 connecting the pins 49 and 52, 53. By means of the stop pin 52, 53, the curved portions of spring legs 50, 51 tend to return to the position shown in FIG. 4 whether they are pulled apart or pushed together.

The center spindle 26 includes a stepped or collar portion 55 which is embraced from below by an ejector lever 56. A further stop 57 is provided to engage the upper surface of collar portion 55 to limit outward movement of spindle 26 to a portion flush with the top surface of socket 25. Ejector lever 56 is mounted about a pivot pin 58, and ejector button 29 is mounted on the end of the lever 57 opposite spindle 26. As can be seen, downward movement of spindle 26 causes the ejector button 29 to pop out of the camera 10.

Integral with the ejector lever 56 is a shutter control arm 59 which correspondingly pivots about pin 58 whenever ejector lever 56 is moved. The stop plate 45 is urged against the free end of arm 59 by its resilient construction. A tension spring 60 which is stronger than the resilience of stop plate 45 urges the arm 59 and stop plate 45 clockwise to the position in which it arrests movement of the shutter blade to limit the shutter opening time. In like manner, spring 60, by way of ejector lever 56, urges spindle 26 upwardly against the stop 57.

As stated, each disposable multilamp photoflash package 14 comprises a connecting center post 23 having a plurality of radially extending retaining lugs 24. Each lug 24 is shaped to include upper and lower ramped surfaces 61, 62. The lower ramped surfaces 62 of the opposing front and back lugs 24 tend to urge the spring legs 50, 51 outwardly as the package 14 is inserted. When the package 14 is inserted sufficiently, the curved portions of legs 50, 51 spring back over the opposing lugs 24. By reason of the acting force on the upper ramped surfaces 61 of the opposing lugs 24, the package 14 is urged downwardly to achieve a firm contact between terminals 27, 28 and the lead-in wires 19, 20 of the forward facing photoflash lamp 15.

In operation, the top surfaces of spindle 25 and ejector button 29 are flush with the camera top surfaces by the urging of spring 60, which also sets the camera for daylight operation by reason of stop 45 being in the path of movement of ear 43 of the impact shutter blade 44 to arrest movement of the shutter blade and thereby limit shutter speed.

A disposable multilamp photoflash unit 14 is then inserted into the socket 25, with one of the unused photoflash lamps 15 facing forward, until the curved portions of spring legs 50, 51 override the lugs 23 to retain the package 14 in the socket 25. Simultaneously, spindle 26 is moved downwardly by center post 23, causing lever 56 to be rotated in a counterclockwise direction about pin 58. Thus, ejector button 29 is moved upwardly, and stop 45 by its resilience is moved out of the path of movement of ear 43 to permit the shutter blade 44 to operate at its full or flash duration. A photographic picture with augmenting flash is then taken by depressing the body release 13 to operate the shutter and ignite the forward facing photoflash lamp 15. After the flash picture is taken, the multilamp unit 14 is rotated in a clockwise direction about its axis of rotation represented by center post 23, until the next succeeding photoflash lamp 15 is facing forward with its corresponding lead-in wires 19, 20 engaging the terminals 27, 28. As is now evident the curved portions of the spring legs 50, 51 maintain engagement with the upper ramped surfaces 61 of the at least two opposing lugs 24 during the rotation.

Upon completion of the taking of four successive flash pictures in the manner described, the used multilamp unit 14 is removed by depressing ejector button 29, causing spindle 26 to move upwardly against the base of post 23. During the upward movement, the upper ramped surfaces 61 push the spring legs 50, 51 apart to release the lugs 24 and permit the unit 14 to be removed. Of course, the unit can be removed after the taking of any number of one or more flash pictures, and the unit reinserted with one of the remaining unused photoflash lamps 15 facing forward.

While this invention has been described with reference to a preferred embodiment, it is obvious that minor variations and changes can be resorted to without departing from the spirit of the invention or the scope of the subjoined claims.

I claim:

1. A photographic camera having a picture-taking axis comprising: a camera body, socket means on the camera body for receiving a multilamp photoflash unit, the socket means defining an access opening for insertion of a portion of the unit in the camera body with the unit in a preselected one of a plurality of flash positions with a corresponding one photoflash lamp of a plurality of lamps facing the direction of the picture-taking axis, spring retaining means engageable with the portion of the unit for releasably retaining the unit in the socket means, circuit terminal means disposed at the socket means for electrical contact with the corresponding photoflash lamp, circuit means for firing the corresponding photoflash lamp in timed relationship with camera operation, means responsive to insertion of the unit for adjusting the camera for flash operation, and ejector means for releasing the unit from the spring retaining means.

2. The camera according to claim 1 wherein the spring retaining means comprises a hairpin spring disposed below the socket access opening and engageable with opposing lugs on the inserted portion of the unit.

3. The camera according to claim 1 wherein the adjusting means comprises a movable spindle having an end disposed at the socket means and engageable with the inserted portion of the unit, and a positionable control arm responsive to movement of the spindle to adjust the camera from daylight operation to flash operation.

4. The camera according to claim 3 and further comprising spring means biasing the control arm toward its daylight operation position.

5. The camera according to claim 3 and further comprising a movable ejection arm engageable with the spindle to move the spindle toward the socket means and release the inserted unit, the ejection arm including a button accessible from outside the camera body for selective movement of the ejection arm.

6. A photographic flash assembly for use in camera opertion comprising in combination:
a housing;
a detachable multilamp photoflash unit including a base support having a plurality of photoflash lamps mounted thereon with corresponding lead-in wires disposed below the base support and a connecting post depending from the base support, the connecting post including a plurality of retaining lugs radially spaced from one another and extending radially outwardly from the connecting post at its lower end with each lug having an upper engaging surface;
socket means on the housing including an access opening for selective insertion of the connecting post into the housing to position the unit on the socket means;
releasable retaining means engageable with the retaining lugs upon insertion into the housing to releasably retain the unit on the socket means, the releasable retaining means comprising a pair of spring legs each disposed on opposing sides of the socket access opening to engage the upper engaging surfaces of opposing retaining lugs to retain the unit on the socket;
terminal means electrically connectable with the corresponding lead-in wires of a selected one of the photoflash lamps; and
circuit means electrically connected to the terminal means to fire the selected photoflash lamp in timed relationship with camera operation.

7. The assembly according to claim 6 wherein the spring legs are laterally extendable and each lug includes a lower ramped surface engageable with the spring leg to laterally extend the legs during insertion.

8. The assembly according to claim 6 wherein the upper engaging surfaces are ramped to cause the spring legs to urge the unit and corresponding lead-in wires toward engagement with the socket means and the terminal means respectively.

9. A photographic camera and flash assembly including means for both flash and daylight camera operation and comprising in combination:
a camera housing;
a detachable multilamp photoflash unit including a base support having a plurality of photoflash lamps mounted thereon with corresponding lead-in wires disposed below the base support and a connecting post depending from the base support, the connecting post including at least one radially extending retaining lug;
socket means on the camera housing including an access opening for selective insertion of the connecting post into the camera housing to position the unit on the socket means;
releasable retaining means engageable with the retaining lug upon insertion into the camera housing to releasably retain the unit on the socket means;
terminal means electrically connectable with the corresponding lead-in wires of a selected one of the photoflash lamps;
circuit means electrically connected to the terminal means to fire the selected photoflash lamp in timed relationship with camera operation; and
a movable spindle having an end disposed at the socket access opening and engageable with and movable by the connecting post upon insertion of the post into the camera housing, a spring means urging the spindle toward the connecting post, and means responsive to movement of the spindle upon insertion to change camera operation to flash.

10. A photographic flash assembly for use in camera operation comprising in combination:
a housing;
a detachable multilamp photoflash unit including a base support having a plurality of photoflash lamps mounted thereon with corresponding lead-in wires disposed below the base support and a connecting post depending from the base support, the connecting post including at least one radially extending retaining lug;
socket means on the camera housing including an access opening for selective insertion of the connecting post into the housing to position the unit on the socket means;
releasable retaining means engageable with the retaining lug upon insertion into the camera housing to releasably retain the unit on the socket means;
terminal means electrically connectable with the corresponding lead-in wires of a selected one of the photoflash lamps;
circuit means electrically connected to the terminal means to fire the selected photoflash lamp in timed relationship with camera operation; and
a movable spindle engageable with the connecting post and ejector means accessible from outside the camera housing for moving the spindle to eject the connecting post from the camera body and detach the unit.

11. A photographic flash assembly for use with a multilamp unit including a base support having a plurality of photoflash lamps and individual reflectors mounted thereon with corresponding lead-in wires disposed below the base support and a connection post depending from the base support, the connecting post having a plurality of spaced radially extending retaining lugs, the flash assembly comprising in combination:

a housing;

socket means on the housing including an access opening for selective insertion of the connecting post of a multilamp unit into the housing to position the unit thereon for rotation relative to the housing;

releasable retaining means including opposing spring legs engageable with opposing retaining lugs upon insertion of the connecting post to releasably retain the unit on the socket means; and circuit means for sequential electrical connection with the corresponding lead-in wires of the unit lamps to sequentially fire the lamps with rotation of the unit.

12. A photographic flash assembly according to claim 11 wherein the opposing spring legs are biased toward each other to urge the retained unit toward the circuit means and are outwardly extendable by engagement with the retaining lugs during insertion.

References Cited by the Examiner

UNITED STATES PATENTS

| | | | |
|---|---|---|---|
| 2,967,469 | 1/1961 | Lachaize | 95—11 |
| 3,087,318 | 4/1963 | Oswold | 240—1.3 X |
| 3,096,025 | 7/1963 | Prochnow | 240—1.3 |

JOHN M. MORAN, *Primary Examiner.*